US010803514B1

(12) United States Patent
Campbell, III et al.

(10) Patent No.: US 10,803,514 B1
(45) Date of Patent: Oct. 13, 2020

(54) INTELLIGENT PRODUCT PLAN DATASET

(71) Applicant: MASSACHUSETTS MUTUAL LIFE INSURANCE COMPANY, Springfield, MA (US)

(72) Inventors: Allan A. Campbell, III, Wilbraham, MA (US); Patrick H. Nadeau, Wolcott, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 739 days.

(21) Appl. No.: 15/355,527

(22) Filed: Nov. 18, 2016

Related U.S. Application Data

(60) Provisional application No. 62/258,319, filed on Nov. 20, 2015.

(51) Int. Cl.
*G06Q 40/00* (2012.01)
*G06F 16/903* (2019.01)

(52) U.S. Cl.
CPC ........... *G06Q 40/00* (2013.01); *G06F 16/903* (2019.01)

(58) Field of Classification Search
CPC .............................. G06Q 40/00; G06Q 16/903
USPC .......................................................... 705/35
See application file for complete search history.

(56) References Cited

U.S. PATENT DOCUMENTS

| | | | | |
|---|---|---|---|---|
| 5,878,405 A * | 3/1999 | Grant | ...................... | G06Q 20/10 705/35 |
| 8,620,785 B1 * | 12/2013 | Wilks | ...................... | G06Q 90/00 705/35 |
| 2002/0107728 A1 * | 8/2002 | Bailey | ...................... | G06Q 30/02 705/14.49 |
| 2008/0201269 A1 * | 8/2008 | Hollins | ...................... | G06Q 40/00 705/36 R |
| 2010/0094740 A1 * | 4/2010 | Richter | ...................... | G06Q 40/02 705/35 |
| 2010/0153298 A1 * | 6/2010 | Fulshaw | ...................... | G06Q 10/10 705/36 R |
| 2010/0161467 A1 * | 6/2010 | Ageenko | ...................... | G06Q 40/00 705/35 |
| 2010/0280935 A1 * | 11/2010 | Fellowes | ...................... | G06Q 40/00 705/35 |

(Continued)

OTHER PUBLICATIONS

Wealth Accumulation and the Propensity to Plan Authors: John Ameriks, Andrew Caplin, John Leahy NBER Working Paper No. 8920; May 2002; JEL No. E2, D1 (Year: 2002).*

*Primary Examiner* — Christopher Bridges
*Assistant Examiner* — Yongsik Park
(74) *Attorney, Agent, or Firm* — Foley & Lardner LLP

(57) ABSTRACT

The method comprises receiving a request to generate a product plan dataset and a first set of data associated with a user comprising a current salary. The method comprises generating and transmitting an instruction to query a second set of data, associated with the user, to a database. The method comprises updating user data, using the first set and the second set of data. The method comprises determining a maximum salary value based on demographic data and user's current salary value, a likelihood of promotion based on demographic data and user's performance reviews, and a future income value based on user's current salary value, maximum salary value, and the likelihood of promotion value. The method also comprises generating a product plan dataset for the user based on user's future income.

18 Claims, 6 Drawing Sheets

(56) References Cited

U.S. PATENT DOCUMENTS

| | | | |
|---|---|---|---|
| 2010/0312603 A1* | 12/2010 | Overman | G06Q 40/02 705/346 |
| 2011/0015958 A1* | 1/2011 | April | G06O 10/06 705/321 |
| 2011/0055066 A1* | 3/2011 | Themmen | G06Q 40/06 705/35 |
| 2016/0350859 A1* | 12/2016 | Dintenfass | G06Q 40/06 |

* cited by examiner

INTELLIGENT PRODUCT PLAN DATASET

CROSS-REFERENCE TO RELATED APPLICATION

This application claims priority to U.S. Provisional Patent Application Ser. No. 62/258,319, filed on Nov. 20, 2015, which is hereby incorporated by reference in its entirety.

FIELD OF THE DISCLOSURE

The present disclosure relates in general to a computer system that generates an intelligent product plan dataset.

BACKGROUND

Several institutions offer users the opportunity to generate custom financial plans based on information provided by the users. An accurate estimation of future income is a vital and important factor in determining an accurate financial plan. Traditionally, many institutions have manually estimated users' future income based on trends and cost of living increases, which relies heavily on information provided by users and is a time-consuming, inaccurate, and arduous process because many users fail to provide full and detailed information because of their unwillingness to devote the time and energy required. As the processing power of computers allow for greater computer functionality and the Internet technology era allows for interconnectivity between computing systems, many users access online resources to provide their information and request custom financial plans. But since the implementation of these more sophisticated online tools, several shortcomings in these technologies have been identified and have created a new set of challenges. For example, users' information may be incomplete due to a service disruption or a network failure. As a result, institutions that utilize existing and conventional methods provide limited and generalized financial plan recommendations and/or plans based on inaccurate or limited user information. Moreover, existing and conventional methods fail to cure the user information deficiency or other shortcomings due to a high volume of user information existing on different networks and computing infrastructures. Managing such information on different platforms is difficult due to number, size, and content of data associated with the users. For example, conventional software solutions may not accurately estimate a future income because data associated with users' future income is usually stored in different databases (e.g., employers' database, social media databases, and the like) and may not be readily available.

SUMMARY

For the aforementioned reasons, there is a need for a more efficient and faster system and method for processing large data sets associated with users, which would allow institutions to profile users in a more efficient manner than possible with human-intervention data-driven analysis. There is a need for a network and computer-specific solution to reduce the level of data-entry efforts required from the users. These features allow performing large work such as time-consuming analysis, data-entry tasks, and generating a future income/custom financial plans in a more efficient manner than other approaches including manual work performed by humans or other conventional software methods.

In an embodiment a method for generating an intelligent product plan dataset. The method comprises receiving, by a server, a first request from a client computing device to generate a product plan dataset for a user. The method comprises generating, by the server, a first instruction configured to display a user interface configured to receive a first set of data associated with the user, wherein the first set of data comprises at least a current salary value associated with the user. The method comprises upon transmitting the first instruction to the client computing device, receiving by the server, the first set of data from the client computing device. The method comprises generating, by the server, a second instruction configured to query a second set of data associated with the user, wherein the second set of data is not associated with the first set of data. The method comprises upon transmitting the second instruction to a first database, receiving by the sever, the second set of data. The method comprises generating, by the server, a third instruction to store updated user data in a second database, wherein the updated user data comprises the first and the second sets of data. The method comprises determining, by the server, a maximum salary value for the user based on the updated user data, wherein the maximum salary value is calculated based on at least one of demographic data and a current salary value associated with the user. The method comprises determining, by the server, a likelihood of promotion for the user based on the updated user data, wherein the likelihood of promotion is calculated based on at least one of a demographic data and a performance review associated with the user. The method comprises determining, by the server, a future income value for the user, based on the current salary value, maximum salary value, and the likelihood of promotion value. The method further comprises generating, by the server, a product plan dataset based at least on the likelihood of promotion, maximum salary value, and the future income value.

In another embodiment a computer system for generation of an intelligent product plan dataset is provided. The computer system comprises a server, which is configured to receive a first request from a client computing device to generate a product plan dataset for a user. The server is configured to generate a first instruction configured to display a user interface configured to receive a first set of data associated with the user, wherein the first set of data comprises at least a current salary value associated with the user. The server is configured to upon transmitting the first instruction to the client computing device, receive the first set of data from the client computing device. The server is configured to generate a second instruction configured to query a second set of data associated with the user, wherein the second set of data is not associated with the first set of data. The server is configured to upon transmitting the second instruction to a first database, receive the second set of data. The server is configured to generate a third instruction to store updated user data in a second database, wherein the updated user data comprises the first and the second sets of data. The server is configured to determine a maximum salary value for the user based on the updated user data, wherein the maximum salary value is calculated based on at least one of demographic data and a current salary value associated with the user. The server is configured to determine a likelihood of promotion for the user based on the updated user data, wherein the likelihood of promotion is calculated based on at least one of a demographic data and a performance review associated with the user. The server is configured to determine a future income value for the user, based on the current salary value, maximum salary value, and the likelihood of promotion value. The server is further configured to generate a product plan dataset based at least on the likelihood of promotion, maximum salary value, and the future income value.

The method described here may enable the access to different programs/software applications within a single platform that may improve the experience of clients and agents regarding the offering of financial products. Numerous other aspects, features and benefits of the present disclosure may be made apparent from the following detailed description taken together with the figures included below.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
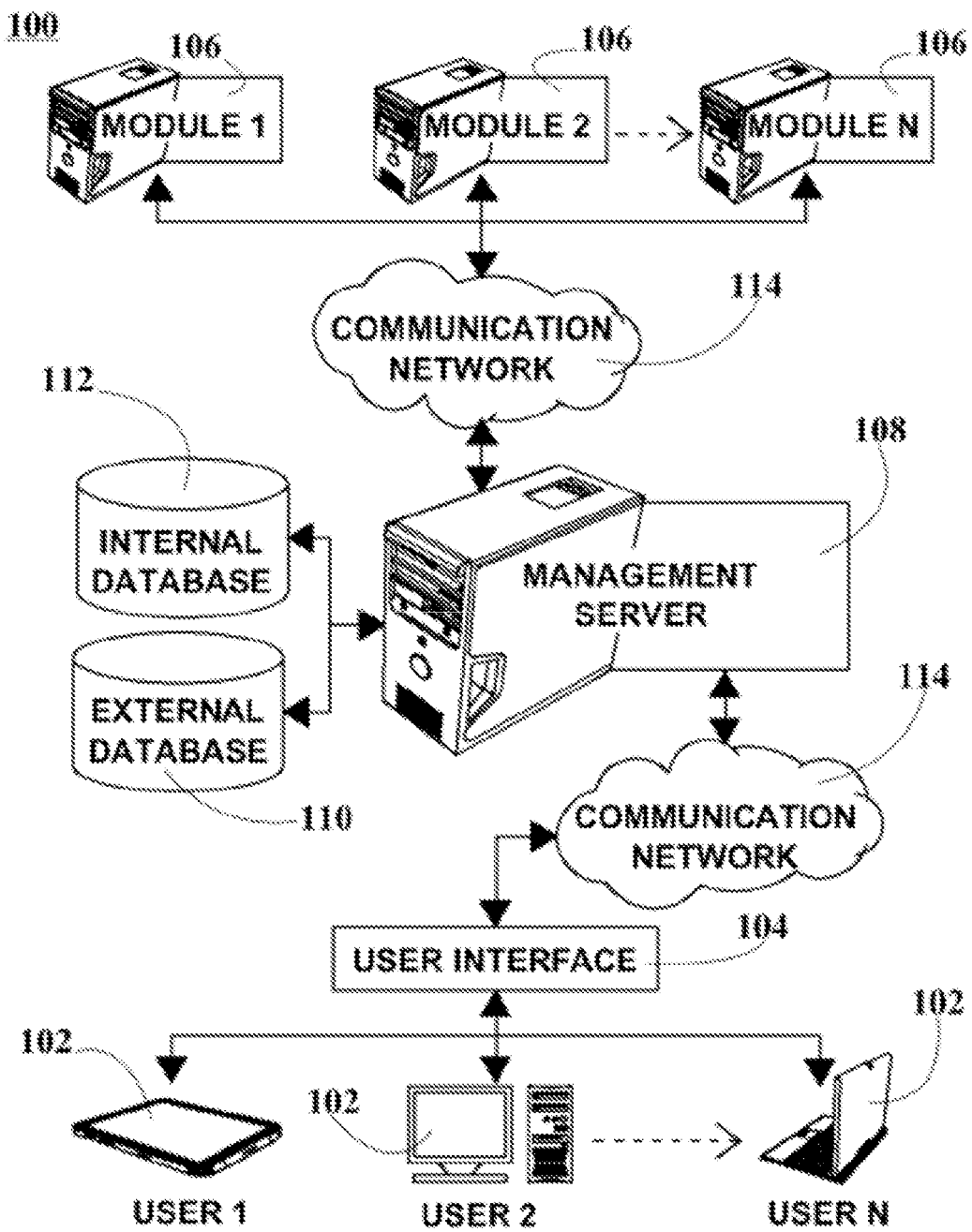
FIG. 1 is a functional block diagram illustrating a system that enables the determination of financial products based on traditional and non-traditional client data, according to an embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 is a functional block diagram illustrating a system that enables the determination of financial products based on traditional and non-traditional client data, according to an embodiment. In FIG. 1, system architecture 100 includes one or more components, such as, computing devices 102, user interface 104, one or more software modules 106, management server 108, external database 110, internal database 112 and, one or more communication networks 114. In some embodiments, each software module 106 within system architecture 100 further includes one or more software applications. It should be understood that system architecture 100 can include more components, less components, or different components depending on desired goals.

In FIG. 1, management server 108 is coupled to and in bidirectional communication with one or more software modules 106 via communication network 114 and management server 108 is additionally coupled to and in bidirectional communication with external database 110 and internal database 112. Management server 110 is coupled to and in bidirectional communication with user interface 104 via communication network 114. User interface 104 is coupled to and in bidirectional communication with one or more computing devices 102.

In FIG. 1, one or more communication networks 114 allow components within system architecture 100 to communicate with one another. Examples of such network connections include any connections between computers such as, for example, intranets, local area networks (LANs), virtual private networks (VPNs), wireless area networks (WANs), and the internet, among others. In some embodiments, computing devices 102 include smartphones, desktop computers, laptops computers, tablets, and PDAs, among others.

In some embodiments, user interface 104 is a graphical interface that receives user input from a user, where a user can be an agent. User interface 104 provides the user input to management server 108 via one or more computing device 102 and one or more communication networks 114. In these embodiments, user interface 104 acts as a single portal for accessing and running different applications within one or more software modules 106. Further to these embodiments, user interface 104 may be configured according to the application being executed by the software modules 106. In these embodiments, user interface 104 is generated at one or more computing device 102 based on instructions received from other computing devices, such as, desktop computers, workstations, and/or servers running various operating systems and associated software packages.

In some embodiments, user input includes personal client data and program(s)/application(s) requests. In these embodiments management server 108 runs a digital fact finder application within a software module to collect personal client data. Further to these embodiments, personal client data includes traditional client data and non-traditional client data that describe specific financial and life characteristics of an associated client. In these embodiments, user interface 104 additionally receives application data and provides the application data to the user.

In these embodiments, traditional client data includes information about clients that can be collected via computing devices 102 in the form of recordings, emails, scanned images, and scanned documents, text files, audio files, competitor product information associated with clients, and the like. Examples of traditional client data include name, marital status, number and identity of dependent persons, job status and current salary, home location, recently acquired assets, medical condition, monthly bills, monthly income, and the like. Further to these embodiments, non-traditional data includes performance appraisals (PA) associated with a client that describes a method by which the job performance of an employee documented and evaluated at the clients place of work. Examples of performance appraisals include performance reviews, performance evaluation (career) development discussions, employee appraisals, and the like.

In some embodiments, requested applications are applications selected manually by the agent. Examples of applications include account review, digital fact finder, needs analysis and planning tool, and the like. In other embodiments, requested applications are applications selected manually by the agent for performing a specific task requiring one or more applications. Examples of tasks include suggesting products based on predictions about future income based on current and past job performance; retrieving and filling in online application form(s); and presenting sales information to clients, among other tasks.

In some embodiments, a program includes one or more pre-selected/pre-ordered applications for performing specific tasks. In these embodiments, each application is associated with a software module 106 and each software module 106 is associated with one or more applications. In an example, when the agent chooses a program to perform to run, the program runs the applications associated with the program in a specific order depending on priority instructions. Applications can be executed whether the applications are resident within the same software module 106 or in different software modules 106.

In some embodiments, management server 108 receives user input from user interface 104 and disaggregates the user input into personal client data and program/application(s) requests. In some embodiments, management server 108 manages the interaction between one or more software modules 106, external database 110, and internal database 112. In addition, management server 108 provides updated client data from internal database 112 and external client data from external database 110 to software modules 106. In an example, if an application within software module 106 requires information from external database 110 and/or internal database 112, management server 108 can coordinate the aforementioned interaction. In these embodiments, management server 108 is implemented through computing equipment that includes a processing unit, disk storage, and connection ports running on server operating systems such as Windows, MAC OS X, Linux, and FreeBSD, among others.

In others embodiments, management server 108 provides the personal client data to internal database 112 and receives updated client data from internal database 112 as required by any applications. Further to these embodiments, management server 108 additionally receives external client data from external database 110. External client data includes traditional external client data and non-traditional external client data received from an external source that describe specific financial and life characteristics of an associated client. Examples of traditional external client data include client demographic information, job history, and the like. Examples of non-traditional external client data include behavioral data, social annotations, recommendations, and social activities outside the work environment.

In some embodiments, management server 108 produces priority instructions based on the received program/application(s) requests. Priority instructions are instructions to applications that determine the order in which the applications are executed within software modules 106.

In some embodiments, management server 108 uses the selected program to assign priorities to one or more applications depending on the specific task to be executed by the program. In these embodiments, management server 108 assigns higher priority to one or more applications based on the current waiting time associated with the application. In other embodiments, management server 108 assigns higher priority to one or more applications based on agent input, such as, determining which application should be executed first. In yet other embodiments, management server 108 assigns higher priority to one or more applications based on the need to provide output data to other applications, such as, applications that require the data before execution. In still yet other embodiments, management server 108 assigns higher priority to one or more applications based on the amount of system resources needed to execute the application and the availability of the system resources.

In some embodiments, based on the assigned priorities management server 108 provides priority instructions to software modules 106 to establish the order in which the applications are executed within software modules 106. In these embodiments, software modules 106 receive priority instructions, updated client data, and external client data from management server 108.

In some embodiments, software modules 106 are implemented as computer software that includes programmatic rules or logic configured to execute one or more applications. In these embodiments, software modules 106 produce application data based on priority instructions, updated client data, external client data, or a combination thereof. Application data is the resultant data from the execution of one or more applications that is presented to the user based on the program/application request of the user input. Examples of application data include suggestions of products, news/alerts reports, personal client data, client's current product information, account information, and the like. In these embodiments, software modules 106 can be implemented by a server, a single computer or multiple computers within a distributed configuration.

In some embodiments, external database 110 is implemented as any suitable database configured to receive, store, and provide external client data to management server 108. In these embodiments, external database receives external client data from external sources such as websites, social media, financial companies and referrals. In some embodiments, internal database 112 is implemented as any suitable database configured to receive and store client data. In these embodiments, internal database 112 provides updated client data to management server 108. In one or more embodiments, external database 112 and internal database 114 are implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that organizes collections of data.

In operation, user interface 104 receives user input from an agent via computing device 102. Subsequently, user interface 104 provides user input to management server 108. Management server 108 disaggregates the user input into personal client data and program/application(s) requests. Management server 108 produces priority instructions based on the received program/application(s) requests. Management server 108 additionally receives external client data from external database 110 and updated client data from internal database 112. Then the management server 108 provides priority instructions to software modules 106 to establish the order in which the applications are executed within software modules. The software modules 106 receive priority instructions, updated client data, and external client data from management server 108. Finally software modules 106 execute the applications based on the priority instructions and produce application data based on priority instructions, updated client data, external client data, or a combination thereof. Software modules 106 send application data to user interface 104 which is presented to computing devices 102.

Figure 2:
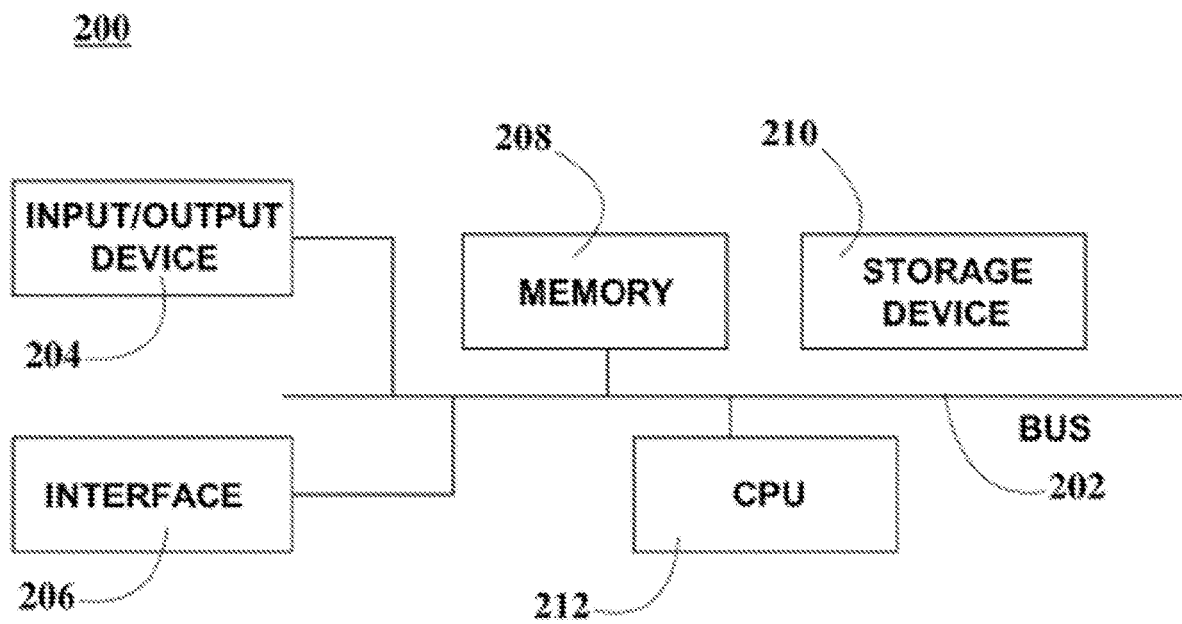
FIG. 2 is an exemplary computing device in which one or more embodiments of the implementation may operate, according to an embodiment.

FIG. 2 is an exemplary Computing Device in which one or more embodiments of the implementation may operate, according to an embodiment. In FIG. 2, Computing Device 200 includes Bus 202, input/output (I/O) Device 204, Communication Interface 206, Memory 208, Storage Device 210 and Central Processing Unit 212. In another embodiment, Computing Device 200 includes additional, fewer, different, or differently arranged components than those illustrated in FIG. 2.

In FIG. 2, Bus 202 is in physical communication with (I/O) Device 204, Communication Interface 206, Memory 208, Storage Device 210, and Central Processing Unit 212. Bus 202 includes a path that permits components within Computing Device 200 to communicate with each other. Examples of (I/O) Device 204 include peripherals and/or any other mechanism that may enable an examiner or candidate to input information to Computing Device 200, including a keyboard, computer mice, buttons, touch screens, touch-pad, voice recognition, biometric mechanisms, and the like. (I/O) Device 204 also includes a mechanism that outputs information to a user of Computing Device 200, such as, for example, a display, a microphone, a light emitting diode (LED), a printer, a speaker, orientation sensors and the like. Said orientation sensors include one or more accelerometers, one or more gyroscopes, one or more compasses, and the like.

Examples of Communication Interface 206 include mechanisms that enable Computing Device 200 to communicate with other computing devices and/or systems through network connections. Examples of Memory 208 include random access Memory 208 (RAM), read-only memory (ROM), flash memory, and the like. Examples of Storage Device 210 include magnetic and/or optical recording medium, Ferro-electric RAM (F-RAM) hard disks, solid-state drives, floppy disks, optical discs, and the like. In one embodiment, Memory 208 and Storage Device 210 store information and instructions for execution by Central Processing Unit 212. In another embodiment, Central Processing Unit 212 includes a microprocessor, an application specific integrated circuit (ASIC), or a field programmable object array (FPOA), and the like. In this embodiment, Central Processing Unit 212 interprets and executes instructions retrieved from Memory 208 and Storage Device 210.

Examples of these implementations include servers, authorized computing devices, smartphones, desktop computers, laptop computers, tablet computers, PDAs, or any other type of processor-controlled device that may receive, process, transmit digital data, and the like. Additionally, Computing Device 200 may perform certain operations that are required for the proper operation of System Architecture 100. Computing Devices 200 may perform these operations in response to Central Processing Unit 212 executing software instructions contained in a computer-readable medium, such as Memory 208.

In one embodiment, the software instructions of a system are read into Memory 208 from another memory location, such as Storage Device 210, or from another Computing Device 200 (e.g., First Computing device, Second Computing device and the like) via communication Interface 206. In this embodiment, the software instructions contained within Memory 208 cause Central Processing Unit 212 to perform processes that will be described in FIGS. 3-6, below.

Figure 3:
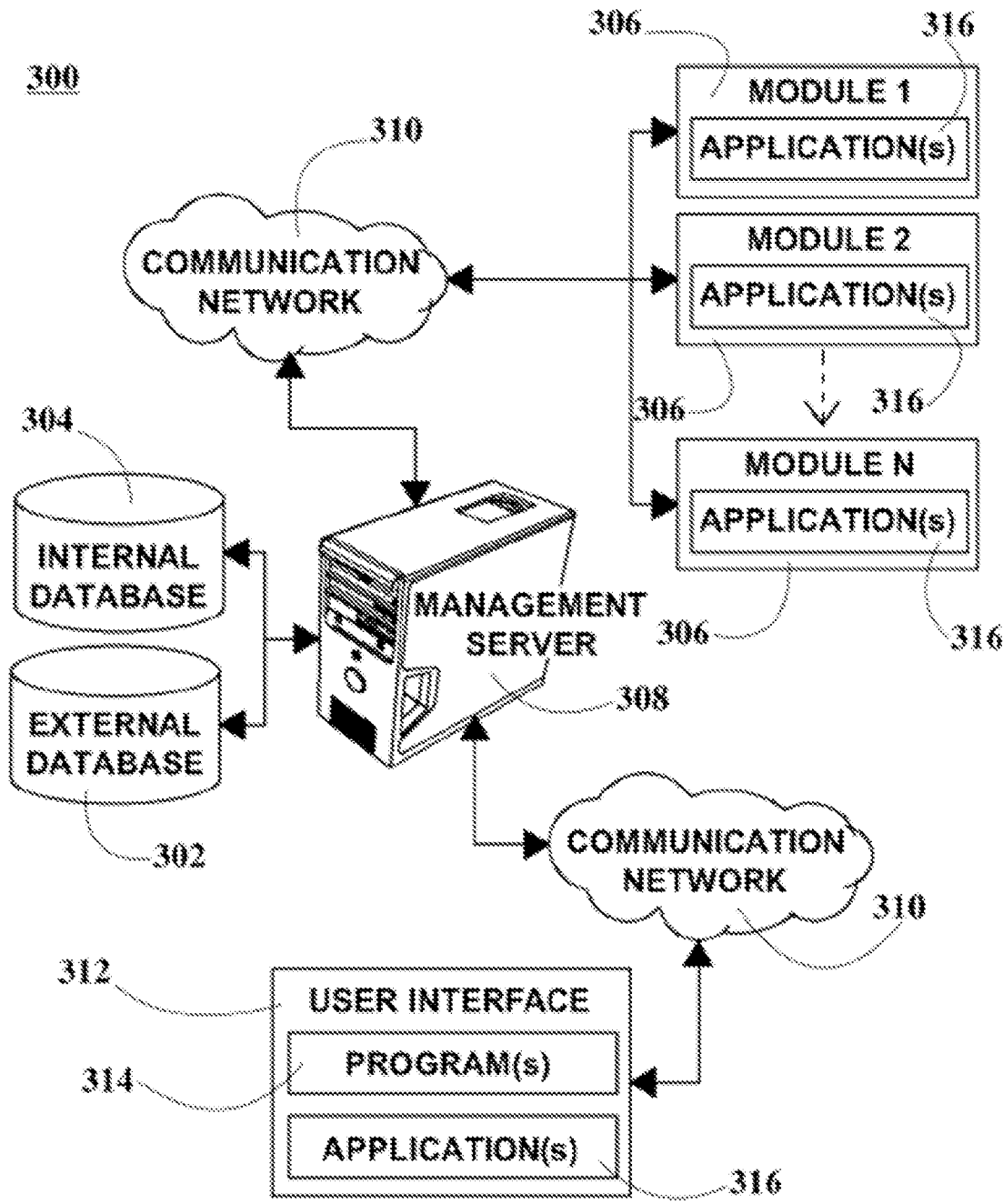
FIG. 3 is a functional block diagram of a subsystem of the system architecture illustrated in FIG. 1, according to an embodiment.

FIG. 3 is a functional block diagram of a subsystem of the system architecture illustrated in FIG. 1, according to an embodiment. In FIG. 3, subsystem 300 includes external database 302, internal database 304, software modules 306, management server 308, one or more communication networks 310, and user interface 312. In FIG. 3, software modules 306 further include one or more applications 316 and user interface 312 further includes one or more programs 314 and applications 316. It should be understood that subsystem 300 can include less components, more components, or different components than those illustrated in FIG. 3.

In some embodiments, software module 306 is coupled to and in bidirectional communication with management server 308 via communication network 310. Management server 308 is coupled to and in bidirectional communication with external database 302 and internal database 304 via communication network 310. Management server 308 is coupled to and in bidirectional communication with user interface 312 via communication network 310. In FIG. 3, one or more communication networks 310 allow components within subsystem 300 to communicate with each other.

In some embodiments, external database 302 is implemented as any suitable database configured to receive, store, and provide external client data to management server 308. In these embodiments, external database receives external client data from external sources such as websites, social media, financial companies and referrals. In some embodiments, internal database 304 is implemented as any suitable database configured to receive and store personal client data. In these embodiments, internal database 304 provides updated client data to management server 308. In one or more embodiments, external database 302 and internal database 304 are implemented through database management systems (DBMS) such as, for example, MySQL, PostgreSQL, SQLite, Microsoft SQL Server, Microsoft Access, Oracle, SAP, dBASE, FoxPro, IBM DB2, LibreOffice Base, FileMaker Pro and/or any other type of database that organizes collections of data.

In an example and referring to FIG. 1, software module 306 functions in a substantially similar manner as software module 106 within system architecture 100. Continuing the example, internal database 304 functions in a substantially similar manner as internal database 112, management server 308 functions in a substantially similar manner as management server 108 and external database 302 functions in a substantially similar manner as external database 110 within system architecture 100. Following the example user interface 312 functions in a substantially similar manner as user interface 104

In some embodiments, user interface 312 is a graphical interface that receives user input from a user, where a user can be an agent. User interface 312 provides the user input to management server 308 via one or more computing device and one or more communication networks 310. In these embodiments, user input includes personal client data and program(s)/application(s) requests.

In these embodiments, requested applications are applications 316 selected manually by the agent. Examples of applications 316 include account review, digital fact finder, needs analysis and planning tool, and the like. In other embodiments, requested applications are applications 316 selected manually by the agent for performing a specific task requiring one or more applications 316. Examples of tasks include suggesting products based on predictions about future income that are based on current and past job performance; retrieving and filling in online application form(s); and presenting sales information to clients, among other tasks.

In yet other embodiments, a program 314 includes one or more pre-selected/pre-ordered applications 316 for performing specific tasks. In these embodiments, each application 316 is associated with a software module 306 and each software module 306 is associated with one or more applications 316. In an example, when the agent chooses a program 314 to run, the program 314 runs the applications 316 associated with the program in a specific order depending on priority instructions. Applications 316 can be executed whether the applications 316 are resident within the same software module 306 or in different software modules 306.

In some embodiments, software modules 306 are implemented as computer software that includes programmatic rules or logic configured to execute one or more applications 316. In these embodiments, software modules 306 produce application data based on priority instructions, updated client data, external client data, or a combination thereof. Application data is the resultant data from the execution of one or more applications 316 and is presented to the user based on the program/application request contained within the user input. Examples of application data include product recommendations, news/alerts reports, personal client data, current product information associated with a client, account information associated with a client, and the like. In these embodiments, software modules 306 can be implemented by a server, a single computer or multiple computers within a distributed configuration.

In some embodiments, software module 306 is implemented as a practice management module, a mobile enablement module, a sales and service automation module, a system collaboration module, a data syndication module, and the like.

In some embodiments, software module 306 is implemented as a practice management software module that includes one or more applications 316 configured to assist an agent in managing his/her practice. In these embodiments, applications 316 configured to assist an agent in managing his/her practice include applications for managing client relations, forms, reports, social media, cloud document storage and delivery, and the like. In an example, software module 306 is implemented as a practice management software module that includes an application that is a salesforce client relationship manager, such as, salesforce CRM software available from salesforce.com, Microsoft dynamics CRM, available from Microsoft.com, and the like. In some embodiments, the salesforce client relationship manager application includes tools to manage client relationships, activities, and to measure client value.

In another example, software module 306 is implemented as a practice management software module that additionally includes an application implementing one or more of the following: automated digital forms; reporting and analytics tools; and a social media marketing system. In some embodiments, the automated digital forms provide quick access to forms in digital PDF format and pre-filled with available personal client data. In other embodiments, reporting and analytics tools provide secure access to client documents using one or more computing devices, such as, computers, tablets, smart phones, among others. In these embodiments, reporting and analytics tools optionally share documents with the home office, peers, staff, and clients, thereby reducing or eliminating email traffic. In other embodiments, social media marketing systems use Facebook, LinkedIn, and/or twitter to establish and enhance relationships with clients. In these embodiments, social media marketing systems choose from pre-approved, professional marketing content to drive new sales and report on the effectiveness of social selling practices.

In some embodiments, software module 306 is implemented as a mobile enablement module that includes one or more applications 316 configured to assist an agent working remotely. In these embodiments, applications 316 configured to assist an agent in working remotely include applications for receiving real time news and alerts, and an application for accessing practice and sales tools, among others.

In an example, software module 306 is implemented as a mobile enablement module that includes an application for receiving real time news and alerts where the alerts can be selected from email notifications, text messages, and the like. In yet another example, software module 306 is implemented as a mobile enablement module that also includes a mobile sales application that provides practice management and sales automation tools.

In some embodiments, software module 306 is implemented as a sales and service automation module that includes one or more applications 316 configured to assist an agent in managing sales. In these embodiments, applications 316 configured to assist an agent in managing sales include a needs analysis and planning tools application, a digital fact-finder application for capturing personal client data, sales illustrations application, online applications for multiple products using a single state filled process, live status updates application, account review (CRC) application, agent self-service application, and an automated sales lead application, among others.

In an example, software module 306 is implemented as a sales and service automation module that additionally includes a digital fact finder application for capturing/retrieving and analyzing information about a particular client. In this example, the digital fact finder application is configured to record a conversation between an agent and a consenting client, extract personal client data from recording, and pre-populate a form using the extracted personal client data.

In another example, the digital fact finder collects other non-traditional external client data such as salary estimates, employer ratings, job ratings, and the like. In this example, the digital fact finder conducts a search to determine a maximum salary an associated client can expect to be paid based on his/her current work experience and job market, such as, for example by crawling the web. In yet another example, the digital fact finder imports an image of a performance review of an associated client and stores at an internal database it for later analysis.

In still yet another example, software module 306 is implemented as a sales and service automation module that includes a needs analysis and planning tools application that provides access to state-of-the-art financial planning tools. In this example, the needs analysis and planning tools application determines the future income of a client based on analysis of his/her performance reviews. In another example, the needs analysis and planning tools application additionally determines the total financial services needs of a client (e.g., including both investment and protection products) to be used in a total needs based selling approach.

In another example, software module 306 is implemented as a sales and service automation module that includes a sales illustration application that provides the functionality to illustrate financial products, such as, for example investment and protection products. In yet another example, software module 306 is implemented as a sales and service automation module that additionally includes online applications that provide multiple products using a single state filled process. In this example, online applications eliminate paper applications and enable straight-thru-processing for core product portfolios (life, health, wealth) via on-line electronic applications built according to industry-standard solutions.

In a further example, software module 306 is implemented as a sales and service automation module that also includes an application for supplying live status updates (e.g., electronic updates) regarding submitted business that is accessed based on profiles/preferences of the requesting agents. In this example, status updates can be received how/when an agent requests them and can additionally include delegated communications.

In yet another example, software module 306 is implemented as a sales and service automation module that additionally includes an account review (CRC) application that allows real time access to a 360 degree view of a client's portfolio. In this example, the account review (CRC) application allows an agent to visualize the products an associated client had acquired from competitors. Further to this example, an agent possessing information about the portfolio of a client would assist the agent in not duplicating the existing financial products of a client.

In still another example, software module 306 is implemented as a sales and service automation module that includes an automated sales leads application that matches a client with an agent and identifies the likely preferences of a client for use in agent engagement of the client based on, for example, demographics and intelligent scoring of decision making probability. In this example, the automated sales leads application is configured to present various sets of questions to a user and collect responses via a computing device. Further to this example, the automated sales leads application stores data collected from the user at internal databases 304. In this example, the automated sales leads application estimates the user's behavioral profile by scoring answers provided by the user. Further to this example, answers provided by the user are used by the automated sales leads application to compare the resulting score with a plurality of behavioral models. In this example, the automated sales leads application retrieves the behavioral models' from internal database 304.

In some embodiments, software module 306 uses big data analytics to approximate the user's behavioral profile by comparing the user score with a plurality of scored user profiles retrieved by the automated sales leads application from internal database 304. In another example, automated sales leads applications estimate risk taking and investment preferences associated with a user, among other preferences and characteristics, by using big data analytics to process the user data retrieved by the automated sales leads application from internal database 304.

In yet another example, software module 306 is implemented as a sales and service automation module that includes an agent self-service application that provides an agent's business book, such as, for example a listing of all clients associated with a particular agent.

In some embodiments, software module 306 is implemented as a system collaboration module that includes one or more applications/tools 316 configured to maintain communication between an agent and his/her office staff, home office, and associated clients. In these embodiments, maintaining communication between an agent and the aforementioned groups improves the efficiency of compliance within the associated financial services company. Further to these embodiments, applications 316 configured to maintain communication between an agent and his/her staff, home office, and associated clients include a digital telephone service, rich e-mail capability and real-time messaging tools, desktop and mobile video conferencing, automated compliance management and an internal video library, among others.

In an example, software module 306 is implemented as a system collaboration module that includes digital telephone service that supports telephone capabilities for offices and agents, including integrated voice messaging. In other example, software module 306 is implemented as a system collaboration module that additionally includes rich E-mail and real-time messaging tools to allow agents access to e-mail as well as instant messaging and presence features designed to connect with his/her staff as well as the home office.

In another example, software module 306 is implemented as a system collaboration module that includes desktop and mobile video conferencing applications that allow an agent to conduct video calls with others personnel in the office, with personnel at the home office, and with clients using high-quality, integrated video conferencing tools. In yet another example, software module 306 is implemented as a system collaboration module that includes an automated compliance management application that delivers collaboration and social media tools for compliance features such as automatic archiving of communications/forms and supervision/management of the compliance and archiving processes.

In some embodiments, a software module 306 is implemented as a data syndication and content module that includes one or more applications 316 configured to provide business information to an agent. In these embodiments, applications 316 configured to provide business information to an agent include a client data services and data hub application, a pre-approved digital content of materials application, an online business reporting warehouse application, an agency websites management application, an online marketing materials application, and a social media application.

In an example, software module 306 is implemented as a data syndication and content module that includes the client data services and data hub application that allows syndication of client and policy details to client relationship management (CRM) platforms. In this example, the client data services and data hub application also receives industry standard feeds to ensure policy details are continuously updated.

In another example, software module 306 is implemented as a data syndication and content module that includes the pre-approved digital content of materials application. In this example, the pre-approved digital content of materials application leverages a library of pre-approved generated digital content and marketing videos, as well as third-party industry news items that are pre-approved by the compliance department.

In yet another example, software module 306 is implemented as a data syndication and content module that includes the online business reporting warehouse application. In this example, the online business reporting warehouse application provides book of business reports for a requesting agent/manager, demographic analysis of all or a portion of the companies clients as well as clients associated with a particular agent, market penetration of the company by area or jurisdiction or of an agent in his/her particular geographic location, operational reports relating to different departments of the company and/or associated with an agent and his/her office, and sales competition results, among others.

In a further example, software module 306 is implemented as a data syndication and content module that additionally includes the managed agency websites. In this example, the managed agency websites deliver pre-approved content and third party content with integrated links to allow the clients to access their account, financial products and links to their own client portal.

In another example, software module 306 is implemented as a data syndication and content module that includes online marketing materials. In this example, online marketing materials provide digital content and pre-approved advertisement available to an agent. Further to this example, online marketing materials are designed to drive business to the agent and help turn prospects into clients.

In yet another example, software module 306 is implemented as a data syndication and content module that includes a social media application. In this example, the social media application delivers pre-approved fan pages (e.g., on Facebook, etc.) to help promote the business.

Figure 4:
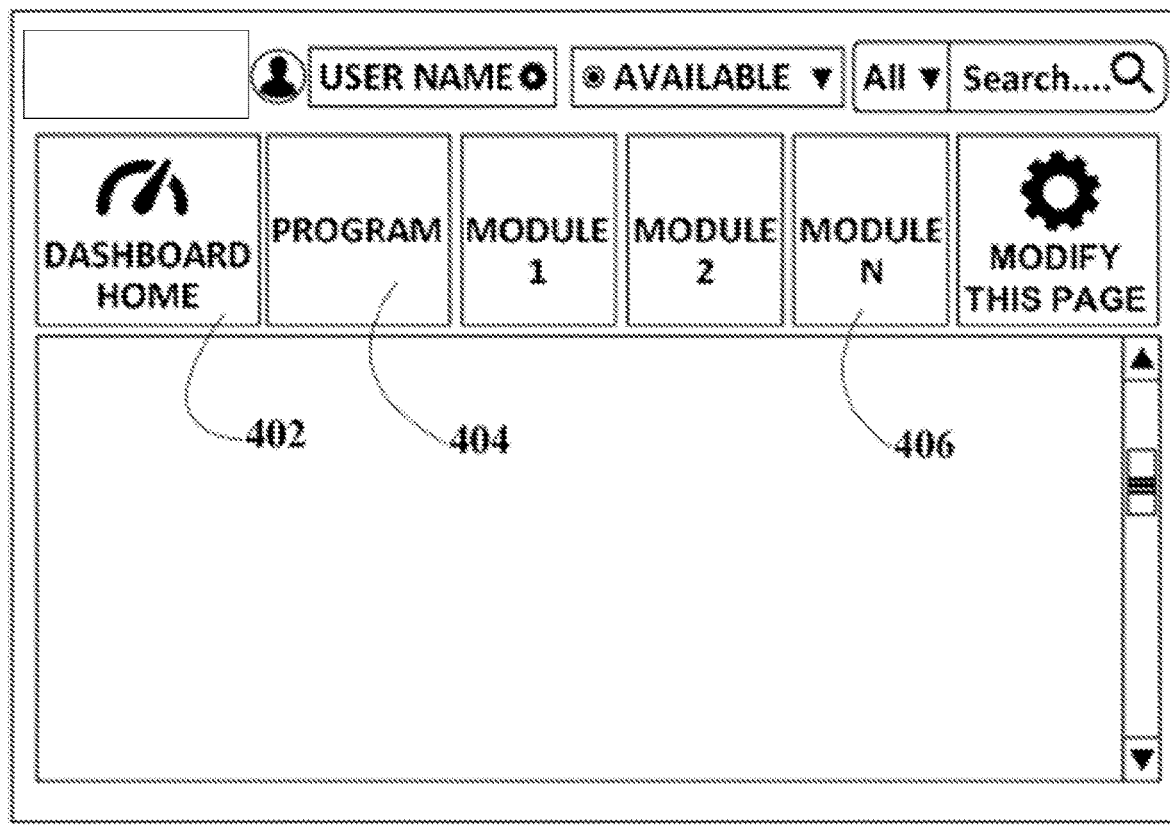
FIG. 4 is a graphical representation illustrating a user interface for an electronic services platform, according to an embodiment.

FIG. 4 is a graphical representation illustrating a user interface for an electronic services platform, according to an embodiment. In FIG. 4, user interface 400 includes dashboard home tab 402, program tab 404 and one or more tabs 406, each associated with a software module, among others. In some embodiments, user interface 400 includes additional, fewer, different, or differently arranged components than those illustrated in FIG. 4.

In some embodiments, user interface 400 is implemented as a graphical interface that receives user input from a user and provides the user input to management server via one or more computing device and one or more communication networks. In these embodiments, user interface 400 functions as a primary portal for accessing and running different applications within one or more software modules. In some embodiments, a user can be an agent, a client, a company employee, and the like. Further to these embodiments, user interface 400 may be configured and/or modified according to the application being executed by the software module(s) associated with tab(s) 406. In these embodiments, user interface 400 is generated at one or more computing devices based on instructions received from other computing devices, such as, desktop computers, workstations, and/or servers running various operating systems and associated software packages. According to some aspects of this embodiment, user interface 400 additionally receives application data from a management server via an associated computing device and one or more communication networks and provides the application data to a user.

In some embodiments, dashboard home tab 402 allows an agent to return to the user interface main screen. In other embodiments, program tab 404 allows the user to select one or more programs to execute one or more specific tasks, such as, suggesting products based on predictions about future job performance, retrieving and populating an online application form, and presenting sales information to clients, among other tasks. In yet another embodiment, software modules tab 406 allows the agent to select the specific software modules and/or additionally select one or more applications within the selected software module.

In operation, the agent accesses the electronic services platform and uses user interface 400 as a primary portal for accessing programs or one or more applications within one or more software modules associated with tab(s) 406. In some embodiments, the agent selects program tab 404 to execute a specific task and user interface 400 displays a screen with different programs to select, where each program allows the agent to execute a different task. In this embodiment, when the agent chooses a program to execute a task, the program will run the applications associated with the task. In another embodiment, the agent can select the software module he wants to work with. In this embodiment, the agent selects a software module tab 406 and user interface 400 produces a drop down box, where the agent can select the application needed.

Figure 5:
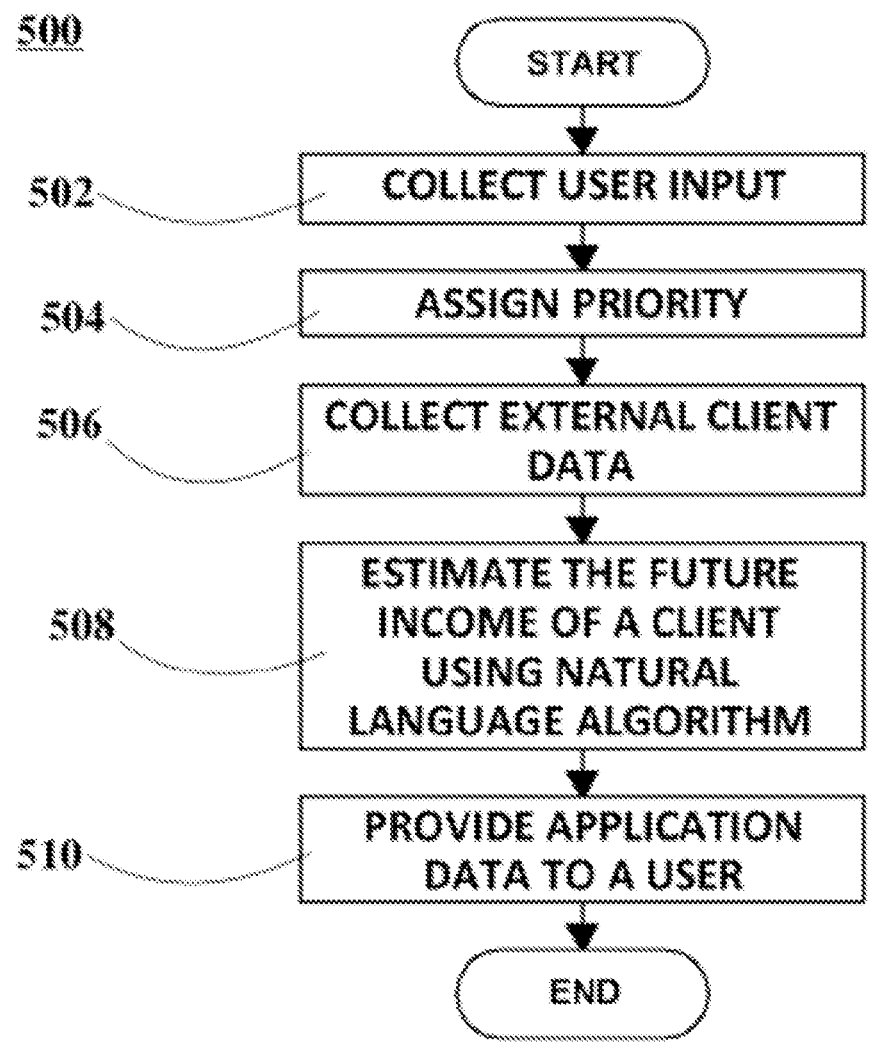
FIG. 5 is a flowchart illustrating an exemplary method of recommending products using a program/application within an electronic services platform, according to an embodiment.

FIG. 5 is a flowchart illustrating an exemplary method of recommending products using a program/application within an electronic services platform, according to an embodiment. A plurality of steps included in method 500 may be performed by one or more computing devices, such as computing device 200 of FIG. 2, implementing/running one or more software modules/processes of the exemplary operating environments of FIGS. 1 and 3. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 5, method 500 starts at step 502. At step 502, a management server collects user input from a user interface via one or more computing devices and one or more communication networks. In some embodiments, user input includes personal client data and program(s)/application(s) requests. In these embodiments, the management server runs a digital fact finder application within a sales and service automation module to collect personal client data. In other embodiments, personal client data includes traditional client data and non-traditional client data that describe specific financial and life characteristics of an associated client. Examples of traditional client data include name, marital status, number and identity of dependent persons, job status and current salary, home location, recently acquired assets, medical condition, monthly bills, monthly income, and the like. Further to these embodiments, non-traditional data includes performance appraisals (PA) associated with a client that describes a method by which the job performance of an employee is documented and evaluated at the place of work of the client. Examples of performance appraisals include performance reviews, performance evaluation (career) development discussions, employee appraisals, and the like.

In some embodiments, the digital fact finder application (e.g., the management server) displays a digital form that allows an agent to fill-in multiple predetermined fields with personal client data associated with a particular client. In these embodiments, the digital fact finder application is also configured so that the agent can record an audio file when interviewing a client. Further to these embodiments, the digital fact finder application processes the recorded audio file from the client interview and extracts additional personal client data from the audio file using voice recognition algorithms. In these embodiments, the digital fact finder extracts personal client data from the recording and populates/pre-populates a digital form using the extracted personal client data. In another embodiment, the digital fact finder imports an image of a performance review of an associated client and stores at an internal database it for later analysis. A person skilled in the relevant art will appreciate that the data type will be changed, by the management server, in order to store the personal client data.

In yet a further embodiment, the management server disaggregates the user input into personal client data and program/application(s) requests. In other embodiments, the management server stores the personal client data at an internal database. In some embodiments, the management server receives additional personal client data from the user interface and stores the additional personal client data at the internal database. In these embodiments, the personal client data and the additional personal client data are combined as updated client data. Updated client data can be further updated in this way whenever the management server receives additional personal client data. Method 500 then advances to step 504.

At step 504, the management server assigns priority instructions to one or more applications available from one or more software modules. In some embodiments, the management server produces priority instructions based on the received program/application(s) requests. Priority instructions are instructions to modules/applications that establish the order in which the applications are executed within the software modules.

In some embodiments, the management server receives instructions from the selected program and assigns priorities to one or more applications based on the received instructions. In these embodiments, the received instructions from the selected programs are based on the specific task(s) to be executed by the program. In other embodiments, the management server assigns higher priority to one or more applications based on the current waiting time associated with the application(s). In yet other embodiments, the management server assigns a higher priority to one or more applications based on agent input, such as, instructions defining which application should be executed first. In still other embodiments, the management server assigns a higher priority to one or more applications based on the need of said applications to provide output data to other applications, such as, applications that require specific data before execution. In still yet other embodiments, the management server assigns a higher priority to one or more applications based on the amount of system resources needed to execute the application and the availability of the system resources. In a further embodiment, the priorities may be received from a client user device.

In some embodiments, the management server additionally sends the priority instructions to one or more software modules. In these embodiments, one or more software modules execute one or more requested applications according to the received priority instructions. Method 500 then advances to step 506.

At step 506, the management server collects external client data from an external database. In some embodiments, the management server collects external client data from an external database using the digital fact finder application by generating and transmitting an instruction to a third-party database to receive further client data. External client data includes traditional external client data and non-traditional external client data received from an external source that describes specific financial and life characteristics of an associated client. Examples of traditional external client data include client demographic information, job history, and the like. Examples of non-traditional external client data include behavioral data, social annotations, recommendations, and social activities outside the work environment. In addition, the management server retrieves updated client data from the internal database as required by any application. The management server may first determine whether one or more categories of data are missing from the user input and collect said information from the external database. For example, if the user input collected in step 502, is missing one or more data fields (e.g., the user did not input information regarding job history), the management server may generate an instruction and query said data from the external database. Method 500 then advances to step 508.

At step 508 the management server estimates the future income of a client. In some embodiments, a needs analysis and planning tool, within a sales and service automation module, estimates a client's future income using the updated client data, the non-traditional client data, and the other non-traditional external client data. In an example, the needs analysis and planning tool estimates a client's future income using estimated incremental living and merit increases as well as the likelihood of promotion(s) and associated salary increases derived from the non-traditional client data, and the estimated maximum salary of the client based on other non-traditional external client data. In yet another embodiment, the management server may determine missing data by determining whether any of the data fields within the user interface has not been inputted/filled out by the user. Upon this determination, the management server may generate an instruction to query said data (e.g., missing data) in addition to other external client data. For example, if the user has not provided the name of the employer, the management server will try to query that information from the traditional or non-traditional client data received. Step 508 is further detailed in FIG. 6, below. Method 500 then advances to step 510.

At step 510, the management server provides application data to a user by instructing a user interface associated with the user to display the data. Application data is the resultant data from the execution of one or more applications that is presented to the user based on the program(s)/application request(s) contained within the user input. In some embodiments, the sales and service automation module produces application data based on priority instructions, updated client data, external client data, or a combination thereof.

In some embodiments, the management server executes the needs analysis and planning tool, within the sales and service automation module, to determine products to recommend to the client by generating a product plan dataset comprising data associated with the user and determined data as stated above. According to some aspects of this embodiment, determining financial products to recommend to the client is based on the estimate of the future income of a client obtained at step 508. In other embodiments, when the estimated future income satisfies a pre-determined threshold, the management server may generate the product plan dataset and recommend a product or plan based on the pre-determined threshold.

In some embodiments, the management server runs an account review application within a sales and service automation module. In these embodiments, the account review application allows real time access to a 360 degree view of a client's portfolio to determine the products the client has previously acquired from the company as well as from competitors. By using the account review application to determine the products the client has previously acquired from the company as well as from competitors, duplication of product offers can be avoided. In other embodiments, the management server generates a list dataset with the products, where this suggestion list may be presented to the agent through the user interface via client computing devices.

In an example, a client is a customer service representative who has updated client data in the internal database and where the updated client data reflects a current salary of $43,000. The needs analysis and planning tool determines that the maximum salary for a customer service manager within the California region is $77,000. In this example, the needs analysis and planning tool determines that the likelihood of a promotion for the customer service representative is about 80% based on the performance reviews. Based on the maximum salary and the likelihood of promotion, the needs analysis and planning tool may estimate a raise of 30% in the current salary of the customer service representative over a given future time period. This raise may correspond to a future salary of $55,900. Additionally the need analysis and planning tool determines from the updated client data that the client recently had a baby. Further to this example, the needs analysis and planning tool, using the information acquired from the account review application, determines that the client does not own a retirement account of any type. The needs analysis and planning tool may suggest an investment product, such as, an annuity, which best matches the potential client needs. In this example, the product(s) recommended reflect changes in the client's salary (based on performance reviews and likelihood of promotion in light of maximum salary/position) and recent life experience as well as current financial product owned and current financial products available from the company. Further to this example, the agent may recommend other products.

Figure 6:
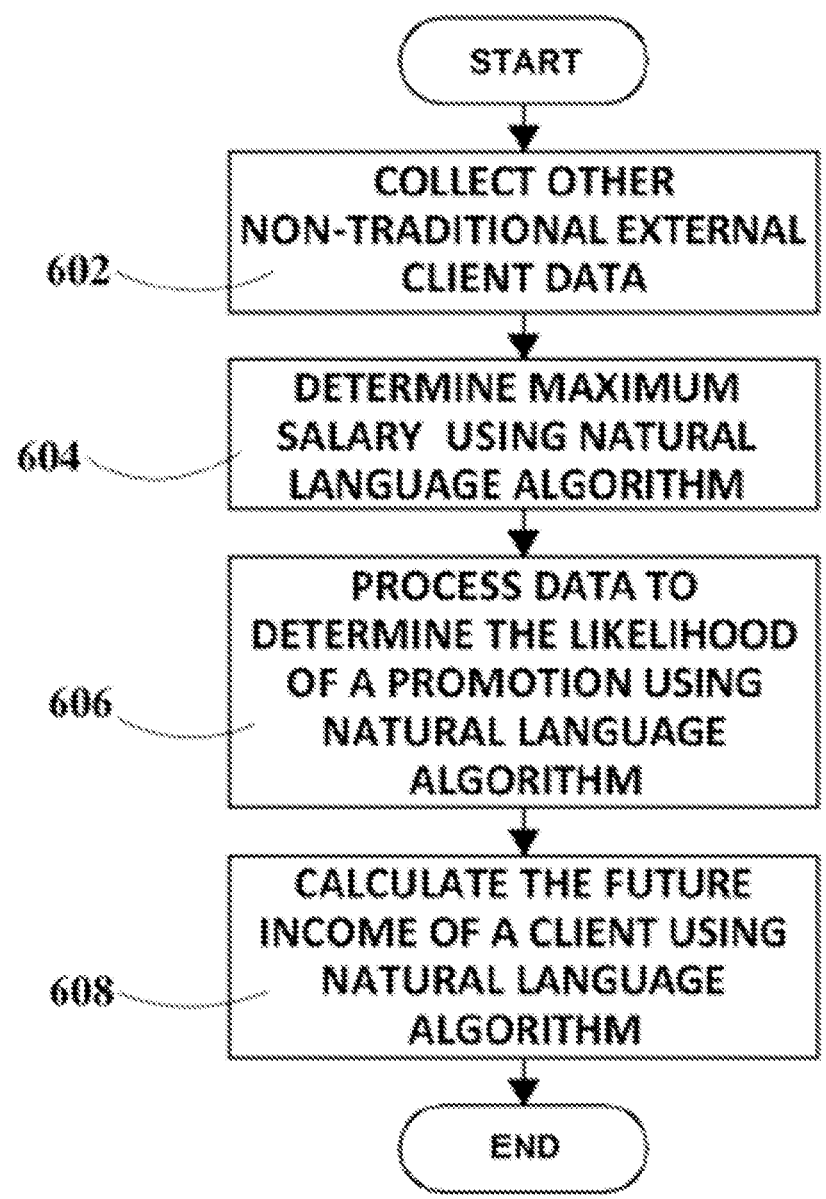
FIG. 6 is a flowchart illustrating an exemplary method for estimates the future income of a client, according to an embodiment.

FIG. 6 is a flowchart illustrating an exemplary method for estimates the future income of a client, according to an embodiment. A plurality of steps included in method 600 may be performed by one or more computing devices such as computing device 200 of FIG. 2 implementing/running one or more software modules/processes of the exemplary operating environments of FIGS. 1 and 3. The steps of this exemplary method are embodied in a computer readable medium containing computer readable code such that the steps are implemented when the computer readable code is executed by a computing device. In some implementations, certain steps of the method can be combined, performed simultaneously, or in a different order, without deviating from the objective of the method.

In FIG. 6, method 600 starts at step 602. At step 602, a software module implemented as a sales and service automation module runs a digital fact finder application to collect other non-traditional external client data from external sources. A person skilled in the relevant art will appreciate that that collecting data may include generating instructions by a server (e.g., management server) configured to collect/query data and transmitting said instruction to a database. In some embodiments, the digital fact finder application searches and queries through the external sources to collect other non-traditional external client data. In these embodiments, the digital fact finder application stores the other non-traditional external client data at an external database. Further to these embodiments, the external sources include websites and social media, among others. Examples of such websites and social media include Facebook, LinkedIn, salary.com, payscale.com, glassdoor.com, careerbliss.com, and the like. In these embodiments, the other non-traditional external client data that can be collected from external sources include salary estimates, employer ratings, job ratings, and the like. Method 600 then advances to step 604.

At step 604, a software module implemented as a sales and service automation module executes the needs analysis and planning tool to determine the maximum salary for the job position of the client. In some embodiments, the needs analysis and planning tool uses the updated client data of a particular client to search for other non-traditional external client data stored in the external database. In these embodiments, the need analysis and planning tool uses the other non-traditional external client data stored in the external database to calculate the maximum salary.

In an example, the needs analysis and planning tool estimates the maximum salary for the job position of the client by using the other non-traditional external client data extracted from salary.com. In this example, if the client is a patent attorney in California and has spent a specific amount of as a patent attorney, the needs analysis and planning tool uses the highest salary of patent attorneys within that geographical region possessing substantially similar experience.

In another example, the needs analysis and planning tool uses the other non-traditional external client data extracted from different websites such as careerbliss.com, salary.com, payscale.com to determine the maximum salary position at the client's employer. In this example, the needs analysis and planning tool averages the different maximum salaries from each of the aforementioned websites to calculate the maximum salary. Method 600 then advances to step 606.

At step 606, the needs analysis and planning tool process data to determine the likelihood of a promotion. In some embodiments, the needs analysis and planning tool process the updated client data, the performance reviews, and the company ratings to estimate the likelihood of promotion for a particular client. In these embodiments, the needs analysis and planning tool employs natural language algorithms to evaluate the language used in the non-traditional client data, specifically from performance reviews, and identifies subjective information such as semantic words associated with a good/poor performance. Further to these embodiments, the natural language algorithms use predetermined semantic words that identify good/poor performance such as efficiency, communication skills, intelligence, quality of service, and accountability, among others. In these embodiments, the needs analysis and planning tool uses the subjective information from the performance review to estimate a likelihood of future promotions of the associated client. In these embodiments, the likelihood of future promotions is calculated by assigning a score to each semantic word associated with a good performance and calculating the average of all the semantic words identified by the natural language algorithms in a performance review.

In another embodiment, the need analysis and planning tool includes a natural language processing module, such as, for example a semantic matching engine available from sovren.com for analyzing the words mentioned in the non-traditional client data, specifically from performance reviews.

In other embodiments, the needs analysis and planning tool uses other non-traditional external client data, such as, company ratings extracted from websites such as glassdoor.com and careerbliss.com to estimate the likelihood of promotions. In these embodiments, the needs analysis and planning tool uses natural language algorithms to analyze written reviews of companies as well as company ratings to estimate the likelihood of promotion for a client working for a specific company. For example, from written reviews of companies and company ratings associated with the client's company, the needs analysis and planning tool may identify positive/negative semantic terms such as career development, management, leadership, opportunity for growth, and the like. In this example, the positive/negative semantic terms may be associated with the likelihood of promotion for the client. Method 600 then advances to step 608.

At step 608, the needs analysis and planning tool calculates the future income of a client. In some embodiments, the needs analysis and planning tool, uses the updated client data, the non-traditional client data, and the other non-traditional external client data. In an example, the needs analysis and planning tool estimates a client's future income using estimated incremental living and merit increases as well as the likelihood of promotion(s) and associated salary increases derived from the non-traditional client data, and the estimated maximum salary of the client based on other non-traditional external data. The needs analysis and planning tool takes the maximum salary of a job position obtained at step 604 as a limit for the future income calculation.

In an example, a client is a junior patent attorney who has updated client data in the internal database. In this example, the updated client data reflects a current salary of $120,000. The needs analysis and planning tool determines that the maximum salary for a senior patent attorney within the California region is $200,000. In this example, the needs analysis and planning tool determines that the likelihood of a promotion for the junior patent attorney is about 70% based on his performance reviews. Based on the maximum salary and the likelihood of promotion, the needs analysis and planning tool may estimate a raise of 25% in the current salary of the junior patent attorney over the next three (3) years. This raise may correspond to a future income of $150,000 in about three (3) years' time.

By executing method 600 through the exemplary operating environments shown in FIGS. 1 and 3, big data analytics and data mining techniques can be implemented for more efficient and faster processing of larger data sets. In this way, efficiencies are created by providing a single platform that enables the access to one or more applications, making the productivity level higher and reducing the error rates. These features allow performing large work such as heavy calculations and time consuming analysis in a more efficient manner than other approaches such as manual work performed by humans.

A system and method that interconnects different applications into a single platform is disclosed herein. The computer platform allows the execution of one or more program(s)/application(s) to perform one or more tasks. In some embodiments, the method and system recommend financial products to a particular client based on the analysis of job performance reviews of a particular client. In these embodiments, a digital fact finder collects personal client data from either the client, the agent, or both and additionally collects other non-traditional external client data from external sources. This data is collected to calculate the estimated future income as well as the estimated maximum salary for current and future job positions of the client. In some embodiments, a needs analysis and planning tool estimates a client's future income using estimated incremental living and merit increases as well as the likelihood of promotion(s) and associated salary increases derived from non-traditional client data such as performance reviews. In these embodiments, the needs analysis and planning tool additionally estimates the maximum salary of the client based on other non-traditional external client data. Further to these embodiments, the need analysis and planning tool uses natural language algorithms to evaluate the language used in the performance reviews as well as company ratings to estimate the likelihood of raises and promotions for a particular client.

In another embodiment, an account review application allows real time access to a 360 degree view of a client's portfolio to determine the products the client has previously acquired from the company as well as from competitors. In yet another embodiment, the needs analysis and planning tool determines financial products to recommend to the client based on the estimate of the future income and the clients current and potential future life experiences. In some embodiments, applications can be executed whether the applications are within the same software module or in different software modules.

While various aspects and embodiments have been disclosed, other aspects and embodiments are contemplated. The various aspects and embodiments disclosed are for purposes of illustration and are not intended to be limiting, with the true scope and spirit being indicated by the following claims.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A method comprising:
   receiving, by a server, a first request from a client computing device to generate a product plan dataset for a user;
   generating, by the server, a first instruction configured to display a user interface configured to receive a first set of data associated with the user, wherein the first set of data comprises at least a current salary value associated with the user;
   upon transmitting the first instruction to the client computing device, receiving by the server, the first set of data from the client computing device;
   generating, by the server, a second instruction configured to query a second set of data associated with the user, wherein the second set of data is not associated with the first set of data;
   upon transmitting the second instruction to a first database, receiving by the server, the second set of data;
   generating, by the server, a third instruction to store updated user data in a second database, wherein the updated user data comprises the first and the second sets of data;
   successively executing, by the server, the plurality of software applications to generate the product plan dataset based on a likelihood of promotion, a maximum salary value, and a future income value, wherein an order of the successive execution of the plurality of software applications is based on a priority value associated with each software application, the priority value corresponding to an amount of system resources required to execute each respective software application and an availability of system resources associated with the server, and wherein the server allocates system resources to each software application in accordance with the priority value associated with each software application, and wherein the server is configured to:
   determine upon execution of a first application having a first priority value, the maximum salary value for the user based on the updated user data, wherein the maximum salary value is calculated based on at least one of demographic data and the current salary value associated with the user;
   determine upon execution of a second application having a second priority value, the likelihood of promotion for the user based on the updated user data, wherein the likelihood of promotion is calculated based on at least one of demographic data and a performance review associated with the user; and
   determine, upon execution of a third application, the future income value for the user, based on the current salary value, the maximum salary value, and the likelihood of promotion value.

2. The method of claim 1, wherein the second set of data comprises at least one of behavioral data, social annotations, recommendations, social activities, the user's demographic data, a performance review, and job history associated with the user.

3. The method of claim 1, further comprising:
   upon transmitting the second instruction to the first database, receiving by the server, the second set of data, wherein the second set of data comprises a performance review associated with the user;
   semantically parsing, by the server, terms used within the performance review;
   assigning, by the server, a score associated with each semantically parsed term associated with good performance used within the performance review;
   determining, by the server, an average assigned score associated with each score associated with the semantically parsed term; and
   determining, by the server, the likelihood of promotion based on the average assigned score.

4. The method of claim 3, wherein the maximum salary value is generated based on the likelihood of promotion.

5. The method of claim 3, wherein the semantically parsed terms comprise: career development, management, leadership, and opportunity for growth.

6. The method of claim 1, further comprising:
   determining, by the server, missing data, wherein the missing data comprises data requested within a data input field of the user interface, wherein the missing data is not received form the user interface;
   generating, by the server, a fourth instruction configured to query the missing data;
   upon transmitting the fourth instruction to the first database, receiving by the server, the missing data; and
   generating, by the server, a fifth instruction to store the updated user data in the second database, wherein the updated user data comprises the missing data, the first set of data, and the second set of data.

7. The method of claim 1, wherein the second instruction is received from the user interface.

8. The method of claim 1, wherein the first set of data is determined based on a received audio file associated with the user.

9. The method of claim 1, wherein the product plan dataset is generated in response to the future income value satisfying a pre-determined threshold.

10. A computer system comprising:
a server configured to:
receive a first request from a client computing device to generate a product plan dataset for a user;
generate a first instruction configured to display a user interface configured to receive a first set of data associated with the user, wherein the first set of data comprises at least a current salary value associated with the user;
upon transmitting the first instruction to the client computing device, receive the first set of data from the client computing device;
generate a second instruction configured to query a second set of data associated with the user, wherein the second set of data is not associated with the first set of data;
upon transmitting the second instruction to a first database, receive the second set of data; generate a third instruction to store updated user data in a second database, wherein the updated user data comprises the first and the second sets of data;
successively execute the plurality of software applications to generate the product plan dataset based on a likelihood of promotion, a maximum salary value, and a future income value, wherein an order of the successive execution of the plurality of software applications is based on a priority value associated with each software application, the priority value corresponding to an amount of system resources required to execute each respective software application and an availability of system resources associated with the server, and wherein the server allocates system resources to each software application in accordance with the priority value associated with each software application;
determine upon execution of a first application having a first priority number a maximum salary value for the user based on the updated user data, wherein the maximum salary value is calculated based on at least one of demographic data and the current salary value associated with the user;
determine upon execution of a second application having a second priority number a likelihood of promotion for the user based on the updated user data, wherein the likelihood of promotion is calculated based on at least one of demographic data and a performance review associated with the user;
determine upon execution of a third application a future income value for the user, based on the current salary value, maximum salary value, and the likelihood of promotion value.

11. The computer system of claim 10, wherein the second set of data comprises at least one of behavioral data, social annotations, recommendations, social activities, the user's demographic data, performance review, and job history associated with the user.

12. The computer system of claim 10, wherein the server is further configured to:
upon transmitting the second instruction to a first database, receive the second set of data, wherein the second set of data comprises a performance review associated with the user;
semantically parse terms used within the performance review;
assign a score associated with each semantically parsed term associated with good performance used within the performance review;
determine an average assigned score associated with each score associated with the semantically parsed term; and
determine the likelihood of promotion based on the average assigned score.

13. The computer system of claim 12, wherein the maximum salary value is generated based on the likelihood of promotion.

14. The computer system of claim 12, wherein the semantically parsed terms comprise: career development, management, leadership, and opportunity for growth.

15. The computer system of claim 10, wherein the server is further configured to:
determine missing data, wherein the missing data comprises data requested within a data input field of the user interface, wherein the missing data is not received form the user interface;
generate a fourth instruction configured to query the missing data;
upon transmitting the fourth instruction to the first database, receive the missing data; and
generate a fifth instruction to store updated user data in the second database, wherein the updated user data comprises the missing data, the first set of data, and the second set of data.

16. The computer system of claim 10, wherein the server is configured to receive the second instruction from the user interface.

17. The computer system of claim 10, wherein the first set of data is determined based on a received audio file associated with the user.

18. The computer system of claim 10, wherein the server is configured to generate the product plan dataset in response to the future income value satisfying a pre-determined threshold.

* * * * *